Oct. 5, 1937.  B. B. WHITTAM  2,094,629
RUBBER GASKET COUPLING
Filed Dec. 23, 1935
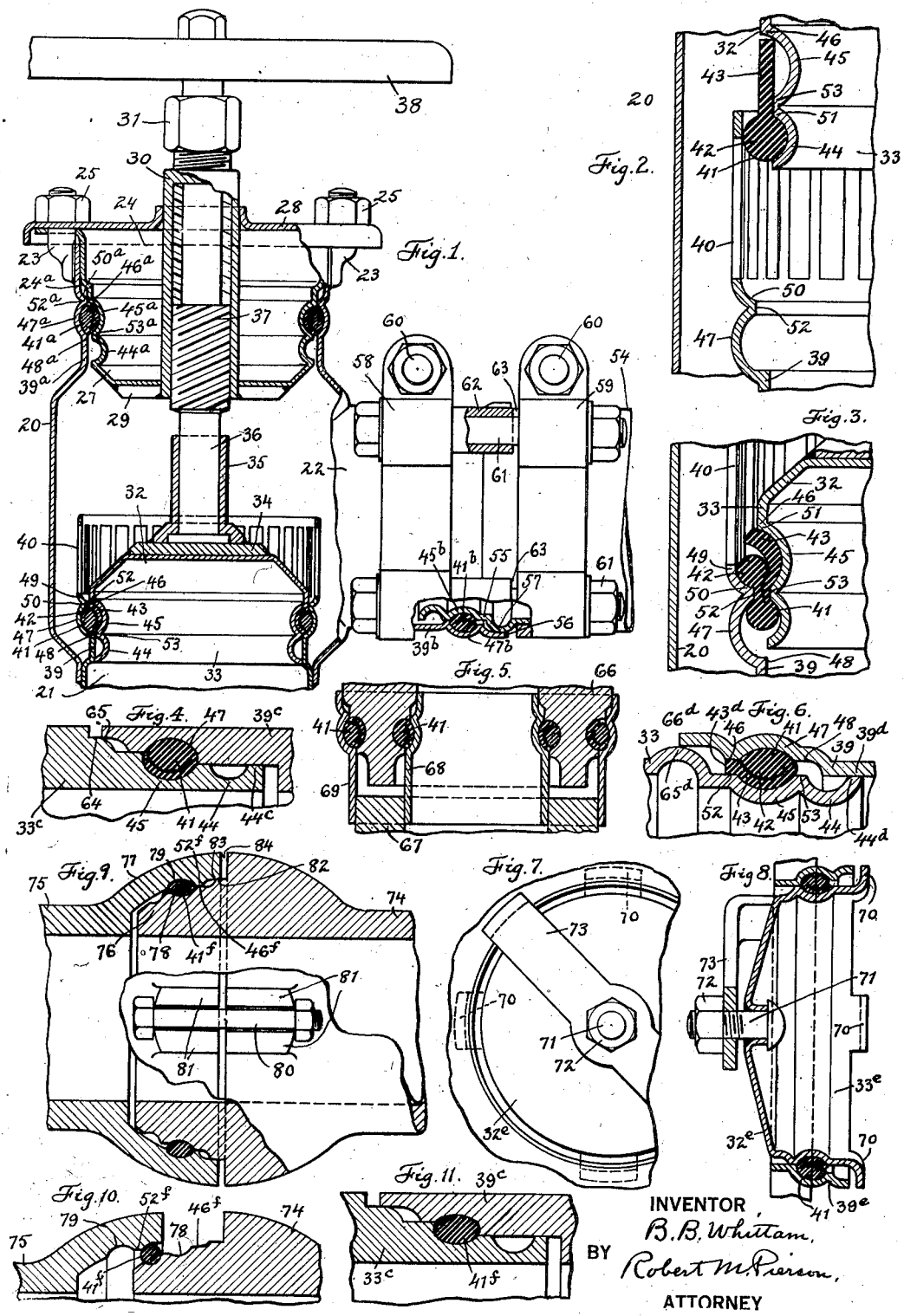
INVENTOR
B. B. Whittam,
BY Robert M. Pierson,
ATTORNEY Patented Oct. 5, 1937

2,094,629

UNITED STATES PATENT OFFICE 2,094,629

RUBBER GASKET COUPLING

Benjamin B. Whittam, Akron, Ohio

Application December 23, 1935, Serial No. 55,777

10 Claims. (Cl. 285—163)

This invention relates to compression joints employing a rollable rubber gasket ring placed between two telescoping parts which are assembled with and yieldably coupled by the gasket through a relative axial movement of said parts, which places the gasket under compression.

An example of such a joint, employing a gasket ring formed as a bead with an attached skirt or band adapted to be folded or wrapped about said bead by the rolling action to compress the gasket between opposed grooved surfaces, is disclosed in my prior application Serial No. 12,444, filed March 22, 1935, and embodied in a jar closure, a pipe coupling, a motor mounting or an oscillating spring shackle joint, as well as being adapted for a wide variety of other purposes.

The general object of my present invention is to obtain additional compression in joints or couplings of this type in order that they may, for example, remain tight under high fluid pressures, as in a valve or a pipe coupling for a high-pressure line, a manhole or a handhole cover for a boiler, and in other situations.

A further object is to so form the parts to be coupled by the rollable gasket, or to so form the gasket itself, that the latter will be capable of affording increased radial compression and tighter sealing under the influence of relative axial movement of the parts to be coupled.

An additional object is to usefully embody a joint of the type mentioned in specific apparatus including a stop-valve structure where the rollable gasket is employed as a packing between the valve and its seat.

Other and incidental objects will appear from the succeeding description.

Of the accompanying drawing, Fig. 1 is a vertical section, partly in elevation, showing my invention embodied in a stop-valve structure and portion of a pipe line in connection with the valve proper and its seat, the valve casing cover and the pipe joint, and employing two different gasket joints of what I term respectively the shear and the overlap types.

Fig. 2 is a fragmental enlarged section showing the gasket unrolled and the valve in an open position.

Fig. 3 is a similar view showing the gasket partly rolled up as the valve approaches or leaves its seat.

Fig. 4 is a fragmental section showing a modified gasket joint of the overlap type.

Fig. 5 is an axial section of a modification wherein the invention is embodied in concentric joints.

Fig. 6 is a fragmental section showing another modification, in which additional compression is obtained in part by extending the gasket skirt.

Fig. 7 is a vertical section showing another embodiment in a packing for a manhole cover or analogous structure.

Fig. 8 is an elevation of the latter, partly broken away.

Fig. 9 is a view in axial section and elevation showing the invention embodied in a pipe coupling and employing a rollable gasket of the skirtless type.

Fig. 10 is a fragmental section of the latter embodiment with the pipe ends withdrawn and the gasket not under compression.

Fig. 11 is a fragmental section showing the invention embodied in another form of joint employing the skirtless gasket.

Referring at first to the embodiment illustrated in Figs. 1, 2 and 3, 20 is the casing of a vertical stop-valve having provision for connection to the piping in angular or elbow fashion, with a vertical inlet at 21 and an outlet at 22.

By reason of the fact that my invention enables the valve to be sealed with very much less mechanical pressure than heretofore, the strength of the casing body at its joints with the casing cover and the pipe connections can be much reduced and the valve in comparatively large sizes made of sheet metal with welded seams and welded to stiff bolt stems such as 23 for fastening the end closure or cover unit 24 at the upper end of the casing by means of nuts 25, and provided with one or more bolting rings such as 58 for making the pipe connections. The end closure 24, consisting of a cup-shaped member 27 telescoping in the upper end of the casing and an upper end disk 28 thereover, may likewise be made out of formed sheet metal and provided with a stiff lower reinforcing plate 29 and a central nut member 30, both welded thereto, and the latter surmounted by a gland 31 for packing the valve stem. In like manner the valve proper or port end closure 32 may consist of an inverted cup-shaped body member 33 formed of sheet metal and surmounted by a stiff reinforcing plate 34 and a valve-stem swiveling tube 35 welded together and to said body member, together with a rotary valve stem 36 having a lower head swiveling in the tube 35, said stem being formed with a steep-pitched screw 37 engaging the female threads of the nut 30, and a reduced upper portion surmounted by a hand wheel 38.

The valve 32 telescopes within a tubular, sheet-metal, valve-seat or port-forming member 39 welded to the body of the casing 20 and whose upper end is extended as a grid or cage 40 formed with outlet slots or equivalent perforations. This reinforced sheet-metal structure, including fittings etc. hereinafter described, greatly reduces the required weight and expense of the valve unit, particularly in the larger sizes. For example, in a 4-inch valve for 125 pounds per square inch fluid pressure, the weight of a unit with standard cast-iron fittings and welded iron pipe as compared with rolled alloy steel fittings and tubing plus rings and bolts usable with the present invention is in the ratio of about 1450 to 322 pounds or 4.5 to 1. But the principles of the invention may also be embodied in a valve structure having a cast-metal casing and end closure with integral bolting connections or other means for connecting with adjacent parts, or made principally of a hardened moldable plastic or other material for special uses such as handling corrosive liquids.

For sealing the valve body member 33 on the seat member 39, these parts are provided with a gasket joint including an interposed rollable rubber gasket member 41 of the wrapping type disclosed in my aforesaid prior application Serial No. 12,444, or of other suitable type which will perform a generally equivalent function in this connection, such as the skirtless gasket hereinafter described in connection with Figs. 9, 10 and 11. The wrapping type is preferred because its volume is built up to give added radial compression as it is rolled into final sealing position. The annular gasket member 41 comprises a marginal bead portion 42 of normally approximate circular section when said member is unrolled as shown in Fig. 2 and having a flat skirt or band portion 43 of smaller thickness integrally formed thereon and in this case extending upwardly. The gasket member surrounds the lower end of the valve member 33 under a slight tension, with the inner side of the bead 42 received in a grooved portion 44 constituting a preliminary seat for the bead on said valve member, and the gasket skirt 43 extends partly over a grooved final seating portion 45 formed on said valve member above the portion 44 and terminating in an overhanging upper edge portion 46.

On the valve seat member 39 is formed a grooved portion 47 constituting an outer final gasket seat complementary to the final seat 45 on the valve, and terminating in a lower annular edge portion 48 of smaller diameter than the edge portion 46 on the valve. Said seat member 39 above the gasket-seating portion 47 is formed with a half-groove 49 at the lower edge of the grid 40, the lower edge part 50 of which constitutes an annular abutment opposed by a complemental annular abutment 51 on the valve for starting the rolling of the gasket bead 42 upon the skirt 43 when said bead is brought down upon the abutment 50 in the closing movement of the valve. Between the valve-seat portions 47 and 49 on the outer member 39 is a short cylindrical face 52 of slightly larger diameter than the complemental face at the edge portion 46 on the valve and fitted to or adapted substantially to meet the latter in closed sliding relation above the gasket when the valve is fully closed as shown in Fig. 1. Below the gasket when in the closed position, the valve is formed with a short cylindrical surface 53, and the seat-member edge 48 with a complemental cylindrical surface of slightly larger diameter fitted to the surface 53 is sliding relation. The distance between the faces 52 and 53 when opposed as in Fig. 3 is equal to the normal thickness of the gasket skirt 43. The rollable gasket and adjacent seating parts having this novel relation therefore constitute what may be termed an axially non-rigid overlap joint having a gasket compressing recess closed at both ends, wherein the closing movement of the valve 32 relative to the seating member 39 is limited by reason of the overlap of the valve margin 46 on the seat margin 48 and the resistance of the interposed rolled gasket.

Modified coupling joints of what might be called the shear type embodying the same general principles as the described valve-sealing joint are illustrated in Fig. 1 for the top cover connection and the horizontal pipe connection of the valve casing 20. A similar joint (not shown) might be used for coupling the valve casing at its lower end to a vertical pipe section, or to another horizontal pipe on a suitably formed T casing. Thus the cover joint includes a rollable skirted rubber gasket 41ᵃ of the form previously described, surrounding the cover member 27, with its bead receivable on a preliminary seating portion 44ᵃ of said member and adapted to be rolled up on the skirt by the downward movement of said cover member within a surrounding gasket-seating member 39ᵃ on the casing 20, wherein the wrapping section is started on the bead by an abutment 50ᵃ and the gasket is finally rolled up under radial compression in a cavity formed between grooved gasket seats 45ᵃ and 47ᵃ on the respective telescoping members. In this case, cylindrical faces 46ᵃ and 52ᵃ on the respective joint members 27 and 39ᵃ are fitted in sliding relation at the upper or rear end of the gasket cavity in the closed position, but said cavity is open at the lower or forward end by a spacing of the cylindrical face 53ᵃ on the cover member from the opposing edge face 48ᵃ on the casing member, which latter face is made of the same diameter as the upper casing-member face 52ᵃ. A shearing action is thereby exerted on the gasket if the cover 24 is moved downwardly beyond a position in which the gasket-seating members 45ᵃ and 47ᵃ are in registry with each other. The spacing between the faces 52ᵃ and 53ᵃ, when opposed, is equal to the normal thickness of the gasket skirt. An ultimate positive rear closing stop may be reached between casing 20 and the flange of cover 24 or between a shoulder 24ᵃ on the latter and the abutment 50ᵃ.

In making the horizontal pipe connection between the outlet member 22 of the valve casing and a pipe section 54, I prefer to employ a rollable skirted rubber gasket 41ᵇ similar to that previously described and mounted between telescoping members 39ᵇ and 55 formed on said casing outlet and pipe section respectively and provided with grooved preliminary and final gasket-seating parts and gasket-rolling abutments of the character previously described, and of the specified construction disclosed in connection with the casing cover seal. These make a joint of the shear type, closed at its inner or forward end and open at its outer or rear end, thus reversing the arrangement of the cover joint as to open and closed ends. A flange extension 56 on the outer telescoping member fits an outer convex annular surface 57 on the pipe section 54 in sliding relation to provide an additional positive radial support of one telescoping member on the other beyond the open end of the gasket cavity, which helps to prevent a relative sagging of one pipe member with respect to the other and thus to preserve the tightness of the seal. For furnishing axial compression on the gasket when this joint has been assembled, the casing outlet 22 and the pipe section 54 respectively are provided with detachable split bolting rings 58, 59 having clamping bolts 60 and connected by bolts 61 for drawing them together. These rings abut against the convex annular beads forming the grooved gasket seats 47b and 45b on the respective telescoping members. Bolt sockets 62 on the ring 58 are shown as spaced from the ring 59 at 63 to provide a take-up to afford added relative axial movement and supplementary gasket compression after the complemental gasket seats are brought into registry.

In the operation of this valve embodiment, the valve 32 being open and the gasket 41 unrolled in the relation indicated in Fig. 2, the hand-wheel 38 and valve stem 36 are turned and the valve is moved down to and past the partly closed position represented in Fig. 3, which rolls the gasket bead upon the skirt and distorts it until the gasket is fully rolled up into the cavity between the registering seats 45 and 47 as represented in Fig. 1, and is held under considerable radial compression between said seats. In moving from the position of Fig. 3 to that of Fig. 1, the compression on the gasket is somewhat relieved and it and the latter tend to snap into the seating cavity with a kind of over-center action. In this position of the parts, the valve will be effectively sealed against pressures up to perhaps 40 to 50 pounds per square inch, but a continuation of the inward axial movement imparted by the screw stem tends to reduce the effective volume of the substantially closed gasket cavity by partially deregistering the seats 45 and 47 in the closing direction. Thereby the axial and the resultant radial compression of the gasket are greatly augmented and the valve is consequently sealed against much higher fluid pressures. The axial force required to impart this added compression is comparatively small and consequently the valve can be readily operated with a steep-pitched screw which promotes a quick opening and closing movement. The mechanical strength of the casing and valve parts is substantially only that required to resist the internal pressure and force the valve of a given area to its seat against that pressure, whereas with the ordinary valve-sealing devices, an additional strength of as much or more again is required for resisting the screw pressure which must be exerted after the valve is closed in order to tightly seal it. A reversal of the screw movement, raising the valve, unrolls the gasket and opens said valve, as will be obvious. A further advantage of the described arrangement is that the rush of fluid past the concave gasket seat 47 when the valve is open produces less scouring or cutting action than on the ordinary valve seat. This rush of fluid at a small valve opening might tend to dislodge the unrolled gasket 41 from its proper place on the valve were it not for the presence of the grid 40 which closely confines said gasket to keep its bead 42 in the preliminary seat 44 and prevent such dislodgment.

The operations in coupling or uncoupling the cover and pipe joints including the gaskets 41a and 41b are broadly similar to those for the valve. When the cover 24, for example, is pushed into the upper mouth of the casing 20, the bead of gasket 41a, by the action of abutment 50a, is rolled from the groove 44a over the gasket skirt so that the rolled gasket will rest under compression in the cavity between the seating grooves 45a and 47a. The bolt nuts 25 are then applied and additional axial inward movement imparted to the cover, causing axial and resultant further radial compression of the gasket under the shearing action of the upper edge abutment 46a, the lower open space between the faces 48a and 53a permitting a somewhat indefinite inward movement of the cover while the gasket pressure is accumulating. A very tight cover joint is thus obtained, with a comparatively small exertion of bolt pressure, and the cover can easily be removed at any time by releasing the bolts and prying it off. The similar operation of assembling the pipe section 54 with the outlet portion 22 of the valve casing and obtaining additional gasket compression through axial movement imparted by the bolts 61 will be evident without further description.

Fig. 4 represents a rolled-gasket joint of the type previously described for sealing the valve in Fig. 1, wherein the skirted gasket 41 is shown rolled up in coupling position, the inner and outer coupling parts 33c and 39c are shown of relatively greater wall thickness and coact with the gasket to form an overlap joint closed at both ends, and the structure is slightly modified by the addition of a short cylindrical surface 65 on the forward extremity of the member 39c, fitted in sliding relation with the surface 64, as a further means of mechanically preserving the axial alignment of the telescoping members. The members are also fitted in sliding supported relation with each other at 44c on the opposite or rear side of the gasket joint. The surfaces of the grooved seats 45 and 47 could be more or less uneven or not machine finished. In this and the subsequent modifications of Figs. 5 and 6, the additional axial compression to assist in coupling the joints or to increase the gasket compression when desired, after they have been assembled, may be obtained by any of the forms of screw means as represented in Fig. 1, or otherwise.

Fig. 5 represents a double coupling employing a pair of concentric rolled-gasket joints of the overlap type, closed at both ends, as previously described for the valve of Fig. 1 and also shown in Fig. 4. 66 and 67 are annular upper and lower parts to be coupled by the concentric inner and outer skirted gaskets 41 whose skirts, when unrolled, extend in opposite directions. The inner gasket encircles an inner tubular terminal portion 68 of the lower member 67 and is rolled up by the coaction of seating and abutment parts, similar to those previously described, formed thereon and upon the inner surface of the upper member 66. The outer gasket encircles said upper member 66 and is rolled up simultaneously with the inner gasket in assembling this double joint by the coaction of similar parts formed upon said upper member and upon an outer tubular terminal portion 69 of the lower member 67.

In the modification of Fig. 6, 33 and 39 are parts to be coupled, having the same general formation as previously described for rolling up a skirted gasket 41 into a cavity formed between inner and outer gasket seats 45, 47 on the respective members and having adjacent pairs of short cylindrical faces 46, 52 and 48, 53 thereon corresponding approximately to the faces bearing the same numbers in Fig. 1, but spaced apart in both cases by a distance equal to the normal thickness of the gasket skirt. Positive sliding support of the telescoping members on each other is supplied at both ends of the joint at 65d, 66d and at 44d, 39d.

The margin of the gasket skirt 43 opposite to the bead 42 is formed with an extension 43ᵈ which is received between the surfaces 46 and 52 in the rolled-up condition of the gasket so as to obstruct the axial outflow of the anterior gasket rubber at that end of the cavity when additional axial pressure is exerted by screw or other mechanical means as previously described, to increase the resultant radial compression on the gasket and thereby augment its sealing or the tightness of its coupling effect. The general effect is broadly of the same character as afforded by closing together the surfaces 46 and 52 in rigid contact as described for the valve in Fig. 1, but in this case is attained by the formation of the gasket itself in coaction with said surfaces when spaced apart, and the joint is more yielding both axially and radially.

Figs. 7 and 8 represent an application of the invention to a joint for a manhole, a handhole, porthole or the like, analogous to that for the valve or the cover represented in Fig. 1. 32ᵉ is a cup-shaped closure having a skirt 33ᵉ received within an opening formed in an outer seating member 39ᵉ, forming part of a container whose chamber is at the right in Fig. 8, the two latter parts being shaped as before for rolling up a skirted rubber gasket 41 between the telecsoping members, to make a joint of the shear type closed at one end. The inner margin of the cup-shaped member is formed with outwardly projecting lugs 70, of a suitable number such as four, preferably equally spaced, and of a length such that, when the plane of the closure 32ᵉ is turned at right angles to that of the seating member 39ᵉ, said closure may be passed through the opening on a diameter about halfway between adjacent lugs. The closure being then turned parallel with the opening, the gasket may be rolled and the joint assembled by drawing the closure outwardly, and the lugs 70, whose diameter exceeds the greatest diameter of the opening, will then prevent the closure from being forced outwardly clear through the opening. An additional outward axial pressure for increasing the compression and sealing effect of the gasket is obtained by a central bolt stem 71 on the closure and a nut 72 screwing thereon against a yoke 73 whose ends are stepped on the stationary structure surrounding the opening.

Figs. 9 and 10 represent certain features of my invention embodied in a pipe coupling of the spherical-joint type permitting a limited relative angular movement of the connected pipe sections 74 and 75. The latter are formed with spherically-shaped interfitting or telescopic male and female pipe ends 76, 77 with complemental gasket-seating grooves 78, 79 and adjacent gasket-rolling and confining formations combined in a joint of the shear type, closed at its forward and open at its rear end, substantially as previously described but modified to the spherical curvature of the pipe ends. The illustrated rubber gasket ring 41ᶠ is of a skirtless normally circular cross section previously known in connection with container closures and adapted to be placed under radial compression by reason of the reduced radial capacity of the gasket cavity as the parts to be coupled are moved from their open position represented in Fig. 10 to the closed or assembled position shown in Fig. 9, wherein the concentric spherical annular surfaces 46ᶠ and 52ᶠ substantially meet to close the gasket cavity at one end. The pipe sections are held together in sealed relation, and additional axial pressure for increasing the radial compression on the gasket to afford a tighter seal before the surfaces 46ᶠ and 52ᶠ meet is provided by longitudinal bolts 80 engaging pairs of spaced lugs 81 formed on the respective sections. Additional annular coacting surfaces 82 and 83 are provided on the respective pipe sections for maintaining them in lateral registry with each other and preventing a relative sagging of one pipe end with respect to the other, which might reduce the gasket compression on one side and tend to cause leakage. An annular clearance is provided at 84 between radial faces on the pipe sections to permit a slight relative angular displacement of the latter. If greater radial gasket compression is desired, it will be understood that a skirted bead gasket of the wrapping type such as previously described could be used in place of the one of normally circular or skirtless section described in this modification. Conversely, it is also possible within the scope of my invention to use a gasket of round or skirtless form in any of the previously described embodiments or in other places, instead of the skirted type, where the fluid pressures to be retained or tightness of the coupling effect required are not as great as that afforded by the skirted type. Fig. 11 represents an overlap joint closed at both ends and constructed substantially as previously described in connection with Fig. 4 and other views, but employing a skirtless gasket 41ᶠ of normally circular section like that used in the joint of Figs. 9 and 10.

While I have illustrated several representative embodiments and uses, it will be understood that other adaptations and modifications could be made within the scope of the invention as defined in the claims.

I claim:

1. A compression joint comprising an inner joint member having a gasket seat, an annular rubber gasket member rollable thereover onto said seat, an outer joint member telescoping over the inner one and having a complemental gasket seat and an anterior abutment for rolling the gasket member, and forming with said seat on the first member an annular gasket cavity substantially closed at one end, and means associated with said members for relatively forcing the outer one axially over the inner one to and beyond the position of registry of said seats.

2. A compression pipe joint comprising a rollable rubber gasket, axially separable inner and outer pipe members having opposed gasket rolling portions and seating portions defining an annular gasket cavity substantially closed at one end for holding the gasket under axial and radial compression, and means for relatively forcing the outer member axially over the inner one to and beyond the position of registry of said seats to bring the gasket between said seats and increase its seated compression.

3. A compression joint structure comprising telescoping parts including a tubular member having a port and a gasket seat, a port closure having a complemental seat, a rubber gasket ring on one of said members, rollable thereover by coaction of the members into a position of radial compression between said seats and formed as a bead having a thinner skirt adapted to be wrapped upon the bead by the rolling action, and screw means for forcing one of said members over the other beyond the position of registry of said seats, to increase the axial and radial compression of the seated gasket ring.

4. A compression joint structure comprising telescoping parts including a tubular member having a port and a gasket seat, a port closure having a complemental seat, a rubber gasket ring on one of said members, rollable thereon by coaction of the members into a position of radial compression between the seats, the maximum diameter of the closure member coacting with the gasket ring in the closed position being greater than that of the complemental gasket seat on the ported member to limit the closing movement of said closure member, and means for forcing one of said members over the other beyond the position of registry of the seats, to increase the axial and radial compression of the seated gasket ring.

5. A structure according to claim 3 embodied in a stop-valve device including a casing having fluid inlet and outlet openings, wherein the telescoping parts are respectively a ported valve-seat member and a valve controlling the port in said member and adapted to be closed by telescoping the parts together, the gasket ring constitutes a packing for sealing said port, and the valve is provided with an operating screw stem.

6. A stop-valve structure comprising a casing having fluid inlet and outlet openings, a valve-seat member in said casing having a gasket seat and a gasket-rolling abutment spaced therefrom, a valve member telescoping within said valve-seat member and having a complementary gasket seat, an annular rubber gasket member carried by said valve member and rollable by said abutment into a position between said seats where it is held under radial distortion to seal the passage between said valve seat and valve members, a grid on the outlet side of said valve-seat member for confining the gasket member when the valve is open, and means for axially moving one of said valve and valve-seat members to open and close the passage between them.

7. A compression joint comprising inner and outer telescoping members having complemental seats defining an annular gasket cavity and the outer member having an annular gasket-rolling abutment, and a rubber gasket ring carried by the inner member and rollable by said abutment into a position of radial compression between said seats, said parts having a form and relation including means for substantially closing the gasket cavity at one end, such that a continuation of the relative axial closing movement of the telescoping members beyond the point of full registering of said seats will increase the effective resultant radial compression on the gasket ring.

8. A compression joint according to claim 7 in which the telescoping members are formed with a pair of concentric annular faces fitted in sliding relation immediately adjacent one end of the cavity formed by the gasket seats when the latter are in registry to substantially close the cavity at that end against extrusion of the rubber gasket ring.

9. A compression joint according to claim 7 in which the gasket ring is formed as a bead having a thinner skirt adapted to be wrapped on said bead and provided with a marginal extension constituting the means for closing the end of the gasket cavity.

10. A compression joint according to claim 7 in which the greatest diameter of the gasket seat on the inner member exceeds that on the outer member and said members are fitted in sliding relation immediately adjacent said seats at both ends of the cavity between said seats to substantially close said cavity at both ends when the seats are in registry.

BENJAMIN B. WHITTAM.